US012078744B2

(12) United States Patent
Stablo et al.

(10) Patent No.: US 12,078,744 B2
(45) Date of Patent: Sep. 3, 2024

(54) BACKLIT RADAR PROTECTION DEVICE

(71) Applicant: COMPAGNIE PLASTIC OMNIUM, Lyons (FR)

(72) Inventors: Frédéric Stablo, Sainte-Julie (FR); Alaeddine Landoulsi, Sainte-Julie (FR)

(73) Assignee: COMPAGNIE PLASTIC OMNIUM, Lyons (FR)

( * ) Notice: Subject to any disclaimer, the term of this patent is extended or adjusted under 35 U.S.C. 154(b) by 483 days.

(21) Appl. No.: 17/433,151

(22) PCT Filed: Feb. 25, 2020

(86) PCT No.: PCT/EP2020/054948
§ 371 (c)(1),
(2) Date: Aug. 23, 2021

(87) PCT Pub. No.: WO2020/173965
PCT Pub. Date: Sep. 3, 2020

(65) Prior Publication Data
US 2022/0155409 A1 May 19, 2022

(30) Foreign Application Priority Data
Feb. 25, 2019 (FR) ...................... 1901928

(51) Int. Cl.
*G01S 7/02* (2006.01)
*B60Q 1/26* (2006.01)
(Continued)

(52) U.S. Cl.
CPC ............ *G01S 7/028* (2021.05); *B60Q 1/2661* (2013.01); *B60Q 1/28* (2013.01); *B60R 13/04* (2013.01);
(Continued)

(58) Field of Classification Search
CPC ........ G01S 7/028; G01S 13/86; G01S 13/931; G01S 2013/93277; B60Q 1/2661; B60Q 1/28; B60R 13/04; H01Q 1/42
(Continued)

(56) References Cited

U.S. PATENT DOCUMENTS 6,184,842 B1 * 2/2001 Leinweber ............ B60R 13/005
156/60
8,752,989 B2 * 6/2014 Roberts ................... G09F 13/06
362/509
(Continued)

FOREIGN PATENT DOCUMENTS

DE 102017214129 A1 * 2/2019 ........... B60R 13/005
JP 2006140956 A * 6/2006 ........... G01S 13/931
(Continued)

OTHER PUBLICATIONS

International Search Report and Written Opinion of International Searching Authority for PCT/EP2020/054948, ISA/NL, Rijswijk, Netherlands, Dated: Apr. 23, 2020.
(Continued)

*Primary Examiner* — Nuzhat Pervin
(74) *Attorney, Agent, or Firm* — M&B IP Analysts, LLC

(57) ABSTRACT

A device for protecting a motor vehicle radar is provided. The device includes a body formed from a material that is transparent to radar waves and visible light, a support that is opaque to light and transparent to radar waves, and a light element arranged between the support and the body, an air cavity being provided between the support and the body, the support and the body being assembled together at their edges, characterized in that the thickness of the cavity is between ½ the radar wavelength and 12 times the radar wavelength.

13 Claims, 2 Drawing Sheets

(51) Int. Cl.
  *B60Q 1/28* (2006.01)
  *B60R 13/04* (2006.01)
  *G01S 13/86* (2006.01)
  *G01S 13/931* (2020.01)
  *H01Q 1/42* (2006.01)

(52) U.S. Cl.
  CPC ............ *G01S 13/86* (2013.01); *G01S 13/931* (2013.01); *H01Q 1/42* (2013.01); *G01S 2013/93277* (2020.01)

(58) Field of Classification Search
  USPC .......................................................... 342/52
  See application file for complete search history.

(56) References Cited

U.S. PATENT DOCUMENTS

| | | | | |
|---|---|---|---|---|
| 10,335,987 | B2* | 7/2019 | Ludwig | H01L 33/58 |
| 10,351,077 | B2* | 7/2019 | Yamada | H01Q 1/3233 |
| 10,727,575 | B2* | 7/2020 | Guretzky | B60R 13/005 |
| 10,976,430 | B2* | 4/2021 | Lind | B60K 31/0008 |
| 2007/0210979 | A1* | 9/2007 | Shingyoji | H01Q 17/001 |
| | | | | 343/711 |
| 2010/0177523 | A1 | 7/2010 | Bisnack | |
| 2012/0323474 | A1* | 12/2012 | Breed | G08G 1/161 |
| | | | | 701/117 |
| 2014/0218263 | A1 | 8/2014 | Burdenski et al. | |
| 2017/0352938 | A1* | 12/2017 | Okumura | H01Q 1/425 |
| 2018/0215086 | A1* | 8/2018 | Geise | B29C 45/1671 |
| 2018/0254551 | A1* | 9/2018 | Guretzky | B60R 13/005 |
| 2018/0275269 | A1* | 9/2018 | Lind | G01S 13/931 |
| 2018/0348362 | A1* | 12/2018 | Callewaert | G01S 13/931 |
| 2020/0251430 | A1* | 8/2020 | Seler | G01S 13/08 |
| 2020/0339053 | A1* | 10/2020 | Bicego | G01S 13/931 |
| 2020/0358174 | A1* | 11/2020 | Shurish | B29C 44/12 |

FOREIGN PATENT DOCUMENTS

| | | | | |
|---|---|---|---|---|
| JP | 5132656 B2 * | 1/2013 | ............ | B60R 13/04 |
| JP | 2019007776 A * | 1/2019 | ............... | G01S 7/03 |
| WO | WO-2018121855 A1 * | 7/2018 | ........... | B60Q 1/0011 |

OTHER PUBLICATIONS

Second Office Action for CN 202080014826.7, dated Apr. 17, 2024. The State Intellectual Property Office of People's Republic of China, Beijing, China.

* cited by examiner

[Fig. 1]
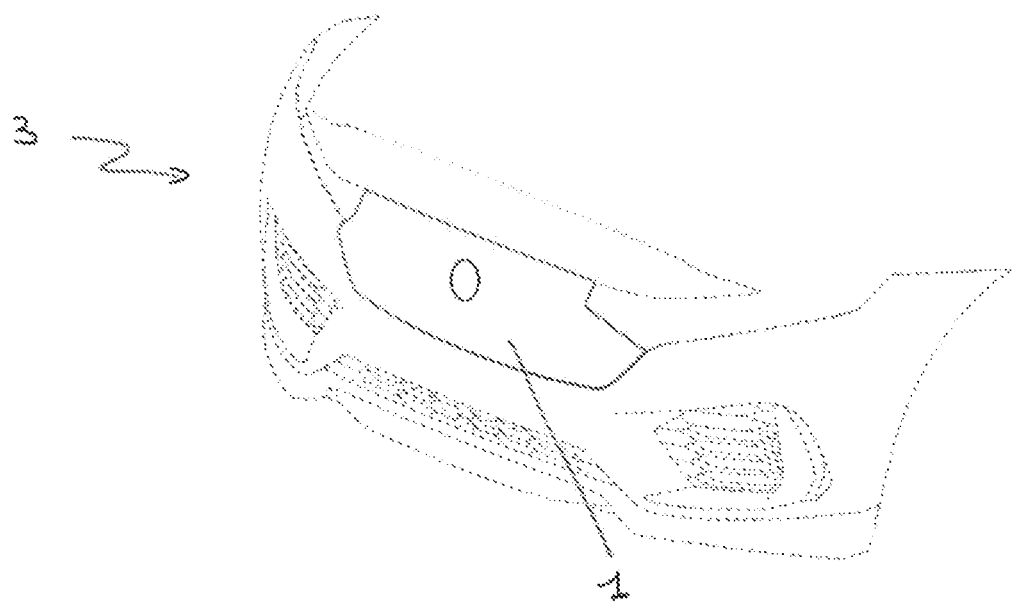
[Fig. 2]
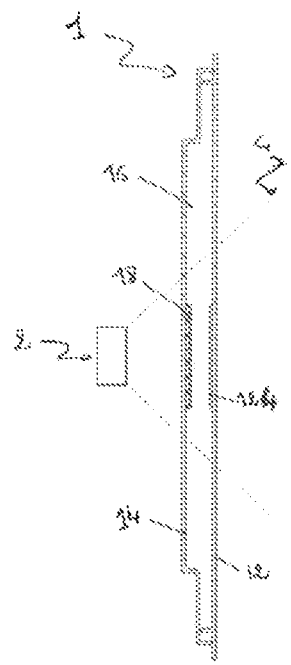

[Fig. 3]
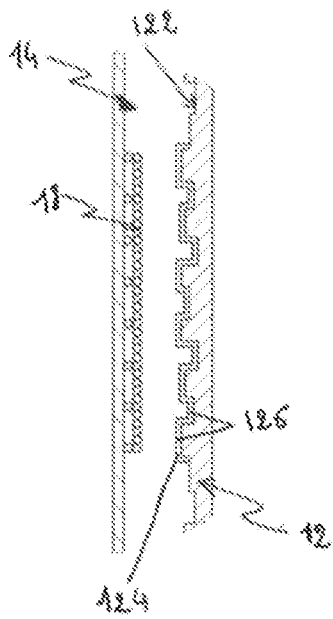
[Fig. 4]
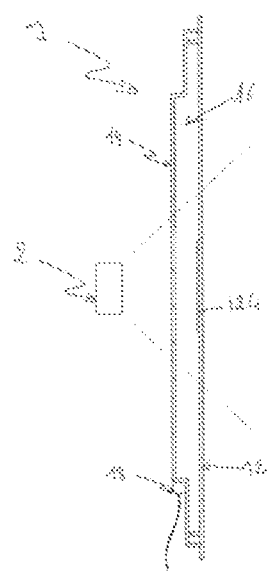

BACKLIT RADAR PROTECTION DEVICE

The present disclosure relates to the field of motor vehicles equipped with radar, and more specifically to the field of devices for masking and protecting such a radar, also referred to as "radomes."

The device according to the disclosed embodiments applies in particular to radars arranged in the front or rear bumper of vehicles, for example ACC vehicles.

For safety reasons in particular, it is known to equip motor vehicles, for example ACC ("adaptive cruise control") motor vehicles, with radars. A radar of this kind is used, in particular, to regulate the speed of the vehicles depending on the traffic and/or obstacles on the road. The radar detects the speed and the distance of the object in front of the carrier vehicle, so as in particular to maintain a safety distance between the vehicles.

Depending on their function, the radars are mounted on the front or rear of the vehicles. In order to hide these radars, whether to protect them from external aggressors (rain, ice, frost, mud, insects, leaves, etc.), or for aesthetic reasons, it is known to use a "radome," i.e. a protective component comprising a plastics cover positioned in front of the radar.

A plastics cover of this kind allows radar waves to pass through with as little attenuation as possible so as not to disrupt operation of the radar itself.

A decorated radome consisting of two plates made of plastics material has already been proposed in application US2014/0218263. In this radome, a decorative metal layer has been vapor-deposited onto one of the plates so as to constitute a decorative pattern. This decorating method has the drawback of being visible only when the vehicle is illuminated, in particular in daylight.

A radome of which all components are transparent to radar waves is also known from the patent JP5132656. The radome comprises an emblem (decorative element) and a frame, and it also comprises a light guide that is connected to a light source placed between the emblem and the frame. The frame is transparent to radar waves and opaque to visible light, the surface of the frame that is exposed to the light guide being a reflective surface. In addition, some parts of the emblem are transparent to light in order to reveal a pattern when it is backlit. The backlighting is provided by a light guide powered by LEDs and consisting of a rectangular resin plate which, on its rear face, has V-shaped grooves of specific shapes required for diffusing the light in a uniform manner. This light guide is complex, moreover this implies that the shape of the grooves is also designed so as not to interfere with the transmission of radar waves.

The object of the disclosed embodiments is to remedy the drawback of the decorated and backlit radome from the prior art by providing a radome that is backlit by means of a light element and that does not require any complex implementation, both with regard to the light element and to the radome as a whole, and one that maintains satisfactory transmission of radar waves while also producing effective backlighting.

To this end, the disclosed embodiments relate to a device for protecting a motor vehicle radar, comprising a body formed from a material that is transparent to radar waves and visible light, a support that is opaque to light and transparent to radar waves, and a light element arranged between the support and the body, an air cavity being provided between the support and the body, the support and the body being assembled together at their edges, preferably in a sealed manner, and the thickness of the cavity being between ½ the radar wavelength and 12 times the radar wavelength, i.e. between approximately 2 mm and 48 mm. The presence of the air cavity is advantageous in that it allows for better transmission of the radar waves, and also in that it allows for simple manufacture of the radar protection device, in particular avoiding the risk of damage to the light element during manufacture. In addition, tests carried out by the inventors have shown that the transmission of radar waves was higher for thicknesses of the air cavity within the range specified above.

Advantageously, the thickness of the cavity is between 1 and 2 times the radar wavelength, i.e. approximately between 4 mm and 8 mm. In this range, the transmission of radar waves is optimal.

The protection device may further comprise one or more of the following features, taken alone or in combination.

The light element is placed on the support in the air cavity, and the light element only covers part of the surface of the support.

The light element is transparent to radar waves. This feature is particularly advantageous when the light element is placed in front of the radar.

The light element comprises optical fibers. Optical fibers adapt well to shapes, for example curved shapes or shapes formed by a protrusion. In addition, the luminance is greater with optical fibers (1600 candela per square meter (cd·m−2 for a surface area of 10 by 400 mm) than with the flat light guides known from the prior art, which have a luminance of approximately 200 cd·m−2. The use of optical fibers therefore makes it possible, with a light source of the same intensity, to produce a brighter decorative element. Traditionally, the homogeneity of the thickness of a radome or of the thickness of the layers making up the radome is considered to be very important for producing the radome function. In a light guide formed of optical fibers, the thickness of said light guide is not homogeneous (cylinders placed side by side) and the surfaces are not smooth. It was therefore not obvious to use optical fibers as a light guide in a radome, as it could be assumed that optical fibers would attenuate the radar waves. Furthermore, the presence of heterogeneous materials that may exhibit different behaviors and different thicknesses could lead to the conclusion that the radome comprising a light guide of this kind would not behave in a homogeneous manner. However, the inventors have shown that optical fibers attenuate radar waves in accordance with the requirements of motor vehicle manufacturers. Optionally, the optical fibers are arranged in a web or in a strand.

The light element comprises organic light-emitting diodes (OLED). OLEDs can form lighting panels that are thin and that produce homogeneous lighting. These panels are generally flexible.

The light element is placed at one end of the support. Preferably, the light element is composed of one LED. As such, the transmission of radar waves is not at all hampered by the presence of the light element. In this case, the entire cavity is illuminated by the LED placed on one end of the support.

Part of the body is covered with a coating that is opaque to light and transparent to radar waves, forming a decorative pattern. As a result, the edges of the decoration are lit by a halo that matches the shape of the decoration.

The total thickness of the protection device is substantially constant, and less than or equal to 6 mm. This makes it possible to maintain good transparency to radar waves.

The internal face of the body is substantially planar. This makes it possible to simplify manufacture of the device.

The internal face of the body comprises raised and recessed portions designed to improve the aesthetic finish of the protection device.

The decorative coating has a metallic appearance. Its appearance is therefore in harmony with the usual aesthetic appearance of a motor vehicle.

The decorative coating is obtained by color or texturing.

The decorative coating is obtained by means of a technique known to a person skilled in the art, such as the hot stamping technique (printing during which a film is pressed against a surface), or by overmolding a metallized film (for example, by previously depositing a thin layer of coating that gives a metallic appearance, the layer being approximately 0.5 μm), or by applying chrome paint, or by means of the vapor deposition technique ("physical vapor deposition," PVD) using metals such as indium, gold or tin. The use of these techniques and these materials makes it possible to give the radome a metallic appearance, because indium, gold and tin do not interfere with the transmission of radar waves. Another advantage of these different techniques is that it is possible to obtain a very thin thickness and to ensure the transparency of the coating to light when said light is activated, while also making it possible to obscure the light source by reflecting ambient light when said light source is off.

The light guide consists of one or more plastics film(s), for example transparent extruded polycarbonate films having a light transmission rate greater than or equal to 90% according to the ISO 13468-2 standard, and a refractive index of 1.584 according to the ISO 62 standard.

The optical fibers can be connected to a light source located outside a zone facing a transmission zone of the radar. This arrangement makes it possible to avoid disrupting operation of the radar.

The support and the body are made of poly(methyl methacrylate) (PMMA), which is opaque for the support and transparent for the body.

The support is made of ASA (acrylonitrile styrene acrylate) or ABS-PC (acrylonitrile butadiene styrene/polycarbonate). The body is made of polycarbonate.

The opaque support is a component, preferably obtained by means of injection molding, which is transparent to light and to radar waves and onto which a resin that is opaque to light and transparent to radar waves has been poured or injection-molded. The opaque resin may be polyurethane.

The disclosed embodiments also relates to a method for assembling the protection device comprising the steps of:
installing the light element on the internal face of the support,
assembling the body and the support in a sealed manner by any suitable means, for example by means of gluing.

The assembly method may further comprise one or more of the following steps, taken alone or in combination:
depositing the decorative coating on the internal face of the body,
encapsulating the light element on the internal face of the support in resin,
manufacturing the opaque support by injection molding a component that is transparent to light and to radar waves and applying, on the external face of said component, a resin that is opaque to light and transparent to radar waves, preferably after the steps of installing the light element and depositing the decorative coating.

The opaque material that fills the rear of the assembly formed by the transparent component, the decorative coating and the light element can be cast at a temperature and a pressure lower than the temperature at which the transparent material is injected. As such, by coating the support with the opaque resin after installing the light guide and depositing the decorative coating, the transparent component is not damaged and the positioning and optical quality of the light guides and of the decorative coating are preserved.

BRIEF DESCRIPTION OF THE FIGURES

The various embodiments will be better understood upon reading the description which follows, given solely by way of example and with reference to the appended drawings in which:

FIG. 1 is a perspective view of the front face of a motor vehicle comprising a device for protecting a radar according to one embodiment.

FIG. 2 is a side section view of a device for protecting a radar of a motor vehicle according to a first embodiment, in which the light element covers part of the support.

FIG. 3 is an enlarged side section view of part of a device for protecting a radar of a motor vehicle according to the first embodiment.

FIG. 4 is a side section view of a device, in which the light element is an LED placed at one end of the support according to a second embodiment.

DETAILED DESCRIPTION

FIGS. 1 to 3 show a device for protecting a radar of a motor vehicle according to a first embodiment, designated by the general reference sign 1.

FIG. 1 shows, by way of non-limiting example, the device for protecting a radar positioned on the front face of a vehicle.

FIGS. 2 and 3 show a first embodiment of the device 1 for protecting a radar 2. In the remainder of the description, the word "radome" is used as a synonym for "protection device." The radar 2 is placed behind the protection device 1. The radar waves 3 transmitted or received by the radar 2 pass through the radome 1. The radome 1 comprises a body 12, which is shown here as a substantially planar plate, but this shape is merely a non-limiting example. For example, the body 12 may be curved in other embodiments. The radome also comprises a support 14. The body 12 and the support 14 are assembled at their respective edges. This assembly is preferably sealed. Sealing is obtained by any suitable means known to a person skilled in the art, for example by means of gluing. A light element 18 is secured to the support 14.

An air cavity 16 is provided between the body 12 and the support 14. The presence of this air cavity 16 has several advantages. Firstly, it allows for simple manufacture of the radome 1 while avoiding the risk of damage to the light element 18 during said manufacturing process. Secondly, it allows for better transmission of radar waves through the radome 1. The transmission of the radar waves is further improved by the presence of the air cavity 16 when the thickness of the air cavity 16 is between ½ the radar wavelength and 12 radar wavelengths. Radars used in motor vehicles generally have a frequency of 77 GHz, and therefore their wavelength is about 4 mm. Therefore, it is advantageous that the thickness of the air cavity 16 is between 2 mm and 48 mm. The transmission of the radar waves in the radome 1 is optimal when the thickness of cavity 16 is between 1 and 2 radar wavelengths, i.e. between 4 mm and 8 mm.

In one embodiment, the light element 18 comprises optical fibers. The optical fibers may be made of plastics material, for example PMMA (polymethyl methacrylate), or another polymer, or even glass. The optical fibers may be woven with a conventional textile yarn, for example polyester, in order to form a web of illuminating fabric. Tests carried out by the inventors have shown that such optical fibers are transparent to radar waves. A light element 18 comprising optical fibers therefore does not disrupt operation of the radar. The optical fibers are powered by a light source which may consist of one or more LEDs. Advantageously, the light source or sources are set aside in a region that is not covered by the radar waves so as not to interfere with the transmission thereof.

In another embodiment, the light element 18 comprises OLEDs (organic light-emitting diodes). The light element 18 may for example be a flexible luminous panel. The OLEDs are preferably transparent to radar waves.

In another embodiment, the light element 18 is a light guide composed of transparent plastics films made of extruded polycarbonate and having a light transmission rate greater than or equal to 90% according to the ISO 13468-2 standard, and a refractive index of 1.584 according to the ISO 62 standard.

Said light guides are diffusing, i.e. the light exit surface is formed by a lateral face of the light guide. As a result, the light emerges from the light guide in a substantially radial direction and the distributed luminous flux is substantially constant at all points on the exit surface of the diffusing portion of the guide.

The body 12 is made of a polymer material that is transparent to visible light and radar waves. Said material may be chosen from PMMA (polymethyl methacrylate), polycarbonate, polypropylene, a polyamide, a copolyester, acrylonitrile butadiene styrene, acrylonitrile styrene acrylate, styrene acrylonitrile, a mixture of acrylonitrile styrene acrylate and polycarbonate, or a mixture of polycarbonate and polyethylene terephthalate, however this list is not exhaustive.

In one embodiment, which can be seen in FIG. 2, the internal face 122 of the body 12 is substantially smooth, which simplifies manufacture.

In another embodiment, which can be seen in FIG. 3, the internal face 122 of the body 12 comprises raised and recessed portions 126. Said raised and recessed portions are designed to improve the aesthetic finish of the radome 1.

In another embodiment, which can be seen in FIG. 4, the light element 18 is relegated to one end of the support 14. In this embodiment, the light element 18 illuminates the entire cavity 16. Preferably, the light element 18 is an LED.

In some cases, it is desirable to have a pattern or decorative element appear on the radome 1 when it is backlit. In this embodiment, a decorative coating or film 124 is formed on the body 12, preferably on the internal face 122 thereof for better durability. The decorative coating 124 may be designed to have a metallic appearance. It can be obtained by means of the hot stamping technique. A metallized film may also be overmolded, or chrome paint may be used. Finally, the vapor deposition technique ("physical vapor deposition," PVD) may also be used. Metals such as indium, gold or tin can be deposited in this manner.

In one embodiment, the support 14 is made of a polymer material that is opaque to visible light and transparent to radar waves. The polymer material may be a polycarbonate (PC), a polypropylene, a polymethyl methacrylate, a polyamide, a copolyester, or acrylonitrile butadiene styrene (ABS), ASA, ABS-PC, and mixtures thereof, for example copolymers, however this list is not exhaustive.

Preferably, the support 14 is black in color.

The support 14 and the body 12 are generally produced by injection molding a suitable polymer material, chosen from those described above by way of example. The different constituents are then assembled.

In an assembly step, the light element 18 is secured to the internal face of the support 14, for example by means of gluing, or by a mechanical means.

Then, in another step, the body 12 and the support 14 are assembled, preferably in a sealed manner, by any suitable means, for example by gluing their respective edges, or by a mechanical securing means that optionally includes a seal.

In one embodiment, a decorative coating 124 is deposited on the internal face 122 of the body 12, generally according to one of the techniques described above (hot stamping, overmolding of a film, chrome paint, PVD). Of course, the decorative coating 124 is deposited before the body 12 and support 14 are assembled.

In one embodiment, the light element 18 is encapsulated in a resin after being secured to the internal face of the support 14. This improves its durability.

In one embodiment, the opaque support 14 is obtained by injection molding a plastics material that is transparent to light and to radar waves, followed by application, on the external face of the transparent component obtained in this manner, of a resin that is opaque to light and transparent to radar waves, preferably after the steps of installing the light element 18 and depositing the decorative coating 124.

Therefore, the opaque resin which fills the rear of the assembly consisting of the transparent component, the decorative coating and the light element can be cast at a temperature and a pressure lower than the temperature at which the transparent resin is injected. Therefore, by coating the support with the opaque resin after installing the light element and depositing the decorative coating, the transparent component is not damaged and the positioning and optical quality of the light element and of the decorative coating are preserved.

What is claimed is:

1. A device for protecting a motor vehicle radar, comprising: a body formed from a material that is transparent to radar waves and visible light, a support that is opaque to light and transparent to radar waves, an air cavity being provided between the support and the body, the support and the body being assembled together at their edges, and a light element arranged between the support and the body within the air cavity, wherein the light element includes optical fibers, wherein a thickness of the air cavity is between ½ a radar wavelength and 12 times the radar wavelength.

2. The device for protecting the motor vehicle radar according to claim 1, wherein the thickness of the cavity is between 1 and 2 times the radar wavelength.

3. The device for protecting the motor vehicle radar according to claim 1, wherein the light element is placed on the support in the air cavity, and the light element only covers part of a surface of the support.

4. The device for protecting the motor vehicle radar according to claim 1, wherein the light element is transparent to radar waves.

5. The device for protecting the motor vehicle radar according to claim 1, wherein the light element is placed on one end of the support.

6. The device for protecting the motor vehicle radar according to claim 1, wherein part of the body is covered with a coating that is opaque to light and transparent to radar waves, forming a decorative pattern.

7. The device for protecting the motor vehicle radar according to claim 1, wherein a total thickness of the protection device is substantially constant, and less than or equal to 6 mm.

8. The device for protecting the motor vehicle radar according to claim 1, wherein an internal face of the body is planar.

9. The device for protecting the motor vehicle radar according to claim 1, wherein an internal face of the body comprises raised and recessed portions designed to improve an aesthetic finish of the protective device.

10. The device for protecting the motor vehicle radar according to claim 1, wherein the support and the body being assembled together at their edges is in a sealed manner.

11. The device for protecting the motor vehicle radar according to claim 1, wherein the thickness of the cavity is between approximately 2 mm and 48 mm.

12. The device for protecting the motor vehicle radar according to claim 2, wherein the thickness of the cavity is between approximately 4 mm and 8 mm.

13. A device for protecting a motor vehicle radar, comprising: a body formed from a material that is transparent to radar waves and visible light, a support that is opaque to light and transparent to radar waves, an air cavity being provided between the support and the body, the support and the body being assembled together at their edges, and a light element arranged between the support and the body within the air cavity, wherein the light element includes organic light-emitting diodes (OLED), wherein a thickness of the air cavity is between $\frac{1}{2}$ a radar wavelength and 12 times the radar wavelength.

* * * * *